United States Patent
Hall et al.

(10) Patent No.: US 12,554,377 B2
(45) Date of Patent: Feb. 17, 2026

(54) DYNAMIC DATA-DRIVEN CONSOLIDATION OF USER INTERFACE INTERACTIONS REQUESTING ROADSIDE ASSISTANCE

(71) Applicant: State Farm Mutual Automobile Insurance Company, Bloomington, IL (US)

(72) Inventors: Ivan D. Hall, Bloomington, IL (US); William Simonovich, Sugar Hill, GA (US); Michelle Delynn Adler, Sugar Hill, GA (US); Jose Gonzalez, Hialeah, FL (US); Eric Skaggs, Bloomington, IL (US); Nicole Leclair, Marietta, GA (US); Andrea Foster, Dunwoody, GA (US); Jason Beckman, Bloomington, IL (US); Josh Schumann, Bloomington, IL (US); Kevin Scott Lenz, Bloomington, IL (US); Ritesh Saraf, Long Grove, IL (US); Eric Brown, Dunwoody, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 28 days.

(21) Appl. No.: 18/498,298

(22) Filed: Oct. 31, 2023

(65) Prior Publication Data

US 2024/0184423 A1    Jun. 6, 2024

Related U.S. Application Data

(63) Continuation of application No. 17/526,354, filed on Nov. 15, 2021, now Pat. No. 11,829,577, which is a
(Continued)

(51) Int. Cl.
*G06F 3/048* (2013.01)
*G06F 3/0482* (2013.01)
(Continued)

(52) U.S. Cl.
CPC ........... *G06F 3/0482* (2013.01); *G06N 20/00* (2019.01); *G07C 5/008* (2013.01); *G08G 1/205* (2013.01)

(58) Field of Classification Search
CPC ...... G06F 3/0482; G06N 20/00; G07C 5/008; G08G 1/205
See application file for complete search history.

(56) References Cited

U.S. PATENT DOCUMENTS 5,644,611 A * 7/1997 McShane ............. H04N 1/3875
                                                                382/282
6,016,438 A * 1/2000 Wakayama ............. G06T 19/00
                                                                324/309
(Continued)

FOREIGN PATENT DOCUMENTS

EP    3239686        11/2017
EP    3578433 A1    4/2019
(Continued)

*Primary Examiner* — Nicholas Augustine
(74) *Attorney, Agent, or Firm* — Lee & Hayes, P.C.

(57) ABSTRACT

A computer-implemented method for dynamic, data-driven consolidation of user interface interactions requesting roadside assistance. The method includes identifying a data objective requiring user data, accessing user data, and determining whether the user data satisfies a confidence threshold. Based at least in part on the confidence threshold determination, one of a first data objective representation and a second data objective representation is displayed. A request for roadside assistance—following satisfaction of the confidence threshold—is also issued.

20 Claims, 22 Drawing Sheets

Related U.S. Application Data continuation of application No. 16/173,555, filed on Oct. 29, 2018, now Pat. No. 11,204,682.

(51) Int. Cl.
*G06N 20/00* (2019.01)
*G07C 5/00* (2006.01)
*G08G 1/00* (2006.01)

(56) References Cited

U.S. PATENT DOCUMENTS

| | | | | |
|---|---|---|---|---|
| 6,049,622 A * | 4/2000 | Robb | G06T 19/003 | 715/810 |
| 6,108,573 A * | 8/2000 | Debbins | G01R 33/54 | 345/157 |
| 6,111,573 A * | 8/2000 | McComb | G09G 5/363 | 715/764 |
| 6,182,127 B1 * | 1/2001 | Cronin, III | G06F 16/9577 | 709/200 |
| 6,502,114 B1 * | 12/2002 | Forcier | G06F 3/0488 | 715/273 |
| 6,510,459 B2 * | 1/2003 | Cronin, III | G06F 16/9577 | 709/200 |
| 7,034,860 B2 * | 4/2006 | Lia | H04N 7/152 | 709/204 |
| 7,417,644 B2 * | 8/2008 | Cooper | G06F 9/451 | 345/619 |
| 7,647,338 B2 * | 1/2010 | Lazier | G06F 3/04817 | 707/999.102 |
| 7,676,763 B2 * | 3/2010 | Rummel | G06F 3/0482 | 715/845 |
| 7,730,425 B2 * | 6/2010 | de los Reyes | G06F 9/451 | 715/834 |
| 8,245,156 B2 * | 8/2012 | Mouilleseaux | G06F 3/04883 | 715/834 |
| 8,279,174 B2 * | 10/2012 | Jee | H04M 1/0268 | 345/157 |
| 8,381,133 B2 * | 2/2013 | Iwema | G06F 3/0488 | 715/845 |
| 8,549,432 B2 * | 10/2013 | Warner | G06F 3/04817 | 715/834 |
| 8,601,389 B2 * | 12/2013 | Schulz | G06F 3/0482 | 715/810 |
| 8,996,987 B2 * | 3/2015 | Rivera | G06F 3/0481 | 715/830 |
| 9,734,532 B1 * | 8/2017 | Brandmaier | H04W 4/02 | |
| 9,830,748 B2 | 11/2017 | Rosenbaum | | |
| 9,990,782 B2 | 6/2018 | Rosenbaum | | |
| 10,269,190 B2 | 4/2019 | Rosenbaum | | |
| 10,467,824 B2 | 11/2019 | Rosenbaum | | |
| 11,227,452 B2 | 1/2022 | Rosenbaum | | |
| 11,407,410 B2 | 8/2022 | Rosenbaum | | |
| 11,524,707 B2 | 12/2022 | Rosenbaum | | |
| 11,594,083 B1 | 2/2023 | Rosenbaum | | |
| 2003/0011638 A1 * | 1/2003 | Chung | G06F 3/0482 | 715/808 |
| 2004/0230940 A1 * | 11/2004 | Cooper | G06F 9/451 | 717/162 |
| 2005/0091596 A1 * | 4/2005 | Anthony | G11B 27/34 | 715/848 |
| 2005/0228250 A1 * | 10/2005 | Bitter | A61B 34/20 | 600/407 |
| 2005/0251021 A1 * | 11/2005 | Kaufman | A61B 6/00 | 600/407 |
| 2005/0278647 A1 * | 12/2005 | Leavitt | G06F 3/04817 | 715/779 |
| 2006/0013462 A1 * | 1/2006 | Sadikali | G16H 30/40 | 382/128 |
| 2006/0074651 A1 * | 4/2006 | Arun | G10L 15/22 | 704/E15.04 |
| 2007/0130519 A1 * | 6/2007 | Tilford | G06F 40/166 | 715/236 |
| 2007/0176898 A1 * | 8/2007 | Suh | H04M 1/72469 | 345/158 |
| 2007/0180397 A1 * | 8/2007 | Hoyer | G06F 3/04886 | 715/780 |
| 2007/0265849 A1 * | 11/2007 | Grost | G10L 15/32 | 704/E15.049 |
| 2008/0036743 A1 * | 2/2008 | Westerman | G06F 3/038 | 345/173 |
| 2008/0201315 A1 * | 8/2008 | Lazier | G06F 16/3325 | 707/999.005 |
| 2008/0218533 A1 * | 9/2008 | Goto | H04M 1/72403 | 345/661 |
| 2009/0144741 A1 * | 6/2009 | Tsuda | G06F 9/5027 | 718/104 |
| 2009/0309849 A1 * | 12/2009 | Iwema | G06F 3/0488 | 345/173 |
| 2009/0327964 A1 * | 12/2009 | Mouilleseaux | G06F 3/04883 | 715/834 |
| 2010/0192103 A1 * | 7/2010 | Cragun | G06F 3/0488 | 715/834 |
| 2011/0154268 A1 * | 6/2011 | Trent, Jr. | G06F 3/017 | 715/863 |
| 2011/0252346 A1 * | 10/2011 | Chaudhri | G06F 3/04817 | 715/765 |
| 2012/0013540 A1 * | 1/2012 | Hogan | G06F 40/177 | 345/173 |
| 2012/0136905 A1 * | 5/2012 | Pullara | G06F 16/904 | 707/E17.005 |
| 2012/0278725 A1 * | 11/2012 | Gordon | H04N 21/858 | 715/738 |
| 2013/0067391 A1 * | 3/2013 | Pittappilly | G06F 3/0482 | 715/781 |
| 2013/0091471 A1 * | 4/2013 | Gutt | G06F 16/54 | 715/848 |
| 2014/0075286 A1 * | 3/2014 | Harada | G06F 40/103 | 715/234 |
| 2014/0143839 A1 * | 5/2014 | Ricci | H04N 21/41422 | 726/4 |
| 2014/0279707 A1 * | 9/2014 | Joshua | G06Q 30/0283 | 701/1 |
| 2014/0303961 A1 * | 10/2014 | Leydon | G06F 40/51 | 704/2 |
| 2014/0306826 A1 * | 10/2014 | Ricci | G08G 1/0968 | 340/573.1 |
| 2016/0071518 A1 * | 3/2016 | Schalk | G10L 15/22 | 704/270.1 |
| 2016/0092962 A1 * | 3/2016 | Wasserman | H04M 3/487 | 705/26.7 |
| 2016/0267723 A1 * | 9/2016 | Rajpathak | G07C 5/008 | |
| 2017/0249844 A1 | 8/2017 | Perkins et al. | | |
| 2018/0077712 A1 * | 3/2018 | Carnevale | H04L 67/04 | |
| 2019/0378201 A1 * | 12/2019 | Briggs | G06V 20/10 | |
| 2020/0226477 A1 | 7/2020 | Jayaraman et al. | | |
| 2022/0092893 A1 | 3/2022 | Rosenbaum | | |
| 2022/0340148 A1 | 10/2022 | Rosenbaum | | |
| 2023/0060300 A1 | 3/2023 | Rosenbaum | | |

FOREIGN PATENT DOCUMENTS

| | | |
|---|---|---|
| EP | 3730375 A1 | 4/2020 |
| EP | 3960576 A1 | 3/2022 |
| EP | 4190659 | 6/2023 |
| EP | 4190660 A1 | 6/2023 |

* cited by examiner

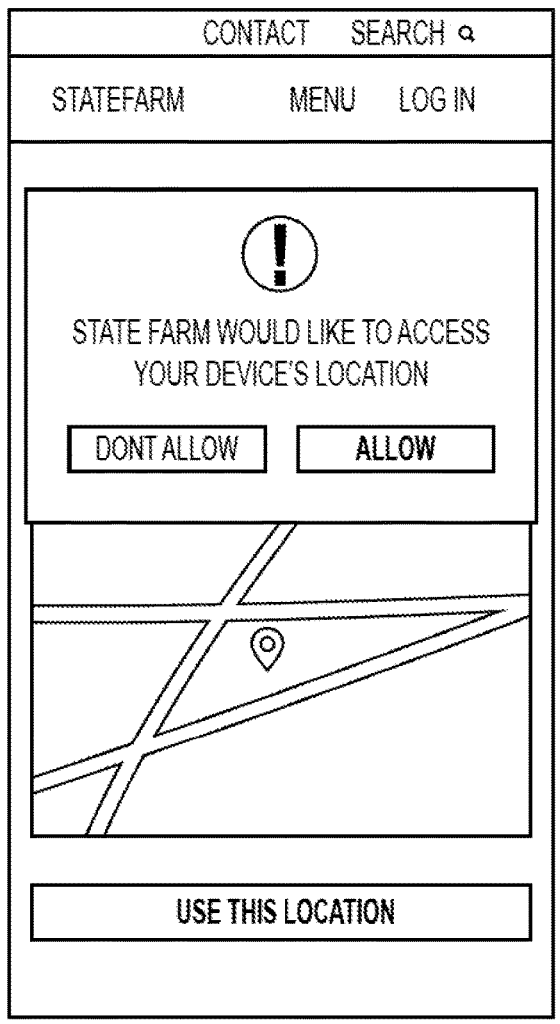
FIG. 13
FIG. 14

FIG. 15

CONTACT    SEARCH 🔍
STATEFARM    MENU    LOG IN
TOW    JUMPSTART    FLAT TIRE    GAS/OIL

- SERVICE
  TOW ⌄
- PICKUP LOCATION
  MY LOCATION ⌄
- POLICY HOLDER
  PAT BEN ⌄
- VEHICLE
  2012 TOYOTA CAMRY ⌄
- CONTACT
  TEXT 678-123-4567 ⌄
- REQUEST FOR
  SELF ⌄

BY CLICKING "CONFIRM" YOU ARE ALLOWING US TO SEND YOUR INFORMATION TO OUR ADMINISTRATOR FOR THIS TRANSACTION WHO WILL SEND HELP SHORTLY.

YOU ARE ALSO CONSENTING TO:
• SHARE INFORMATION WITH ANY SERVICE PROVIDER WHO WILL PROVIDE ASSISTANCE FOR THIS TRANSACTION
• ALLOW US TO CONTACT YOU THROUGHOUT THIS TRANSACTION USING YOUR PREFFERED CONTACT METHOD

READ THE FULL TERMS AND CONDITIONS

☐ I AGREE TO THE TERMS OF CONSENT

[ CONFIRM ]
CANCEL

QUESTIONS?
CALL US AT 800-867-5309

FIG. 16

CONTACT    SEARCH 🔍
STATEFARM    MENU    LOG IN

✅ YOU'RE ALL SET
YOUR CONFIRMATION NUMBER IS 2345869
WITHIN 10 MINUTES WE'LL CONTACT YOU
WITH SERVICE DETAILS

YOUR SELECTION    EMAIL THIS PAGE

- SERVICE
  TOW ⌄
- PICKUP LOCATION
  MY LOCATION ⌄
- POLICY HOLDER
  PAT BEN ⌄
- VEHICLE
  2012 TOYOTA CAMRY ⌄
- CONTACT
  TEXT 678-123-4567 ⌄
- REQUEST FOR
  SELF ⌄
- SERVICE DETAILS
  246 PERIMETER CENTER NE, ATLANTA, GEORGIA

QUESTIONS?
CALL US AT 800-867-5309

SOME SAFETY TIPS

📱 911

● ○ ○

IF YOU BREAKDOWN IN A DANGEROUS AREA, CALL THE POLICE AND STAY IN YOUR VEHICLE WITH THE DOORS LOCKED UNTIL HELP ARRIVES.

DYNAMIC DATA-DRIVEN CONSOLIDATION OF USER INTERFACE INTERACTIONS REQUESTING ROADSIDE ASSISTANCE

CROSS-REFERENCE TO RELATED APPLICATIONS

The present patent application is a continuation of, and claims the benefit of, U.S. application Ser. No. 16/173,555, filed Oct. 29, 2018 and entitled "DYNAMIC DATA-DRIVEN CONSOLIDATION OF USER INTERFACE INTERACTIONS REQUESTING ROADSIDE ASSISTANCE," which is hereby incorporated by reference in its entirety.

FIELD OF THE INVENTION

The present disclosure generally relates to computer-implemented methods, systems comprising computer-readable media, and electronic devices for enabling prompt and efficient issuance of roadside assistance requests via computing devices.

BACKGROUND

Existing software-based and mobile device-based systems used by motorists seeking roadside assistance rely on user-dominated navigation and data entry to complete assistance requests. For instance, an existing software application for completing a request may provide a series of pre-defined menus and data fields that the user may selectively navigate and input data to, respectively, seeking to fulfill minimum data requirements for each service request. Such applications are essentially static and inflexible, setting a series of conditions that must be satisfied by every user seeking a particular type of assistance.

BRIEF SUMMARY

Embodiments of the present technology relate to systems and computer-implemented methods for prompt and efficient issuance of roadside assistance requests via computing devices. The embodiments may provide a flexible user experience wherein a dynamic system guides data retrieval and entry requirements to minimize the number of interactions the user must have at a user interface to request a service.

More particularly, in a first aspect, a computer-implemented method for dynamic, data-driven consolidation of user interface interactions requesting roadside assistance may be provided. The method may include identifying a data objective requiring user data, accessing user data, and determining whether the user data satisfies a confidence threshold. Based at least in part on the confidence threshold determination, one of a first data objective representation and a second data objective representation may be displayed. A request for roadside assistance—following satisfaction of the confidence threshold—may also be issued. The method may include additional, less, or alternate actions, including those discussed elsewhere herein.

In another aspect, an electronic computing device for dynamic, data-driven consolidation of user interface interactions requesting roadside assistance may be provided. The computing device may include a communication element, a memory element and a processing element. The communication element may be configured to provide electronic communication with a communication network. The processing element may be electronically coupled to the memory element and to the communication element. The processing element may be configured to execute a customer software application configured to: (1) identify a data objective requiring user data, access user data, and determine whether the user data satisfies a confidence threshold; (2) based at least in part on the confidence threshold determination, display one of a first data objective representation and a second data objective representation; and/or (3) following satisfaction of the confidence threshold, issue a request for roadside assistance. The system may include additional, less, or alternate functionality, including that discussed elsewhere herein.

In still another aspect, a system comprising computer-readable media for dynamic, data-driven consolidation of user interface interactions requesting roadside assistance may be provided. The system may include a non-transitory computer-readable medium with a program stored thereon, wherein the program instructs a hardware processing element of a device to: (1) identify a data objective requiring user data, access user data, and determine whether the user data satisfies a confidence threshold; (2) based at least in part on the confidence threshold determination, display one of a first data objective representation and a second data objective representation; and/or (3) following satisfaction of the confidence threshold, issue a request for roadside assistance. The program(s) stored on the computer-readable media may instruct the processing elements to perform additional, fewer, or alternative actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

FIGS. 7-16 illustrate various graphical user interfaces dynamically generated by the ERS application of FIG. 5 for providing roadside assistance according to embodiments of the present inventive concept;

Figures 17, 18:
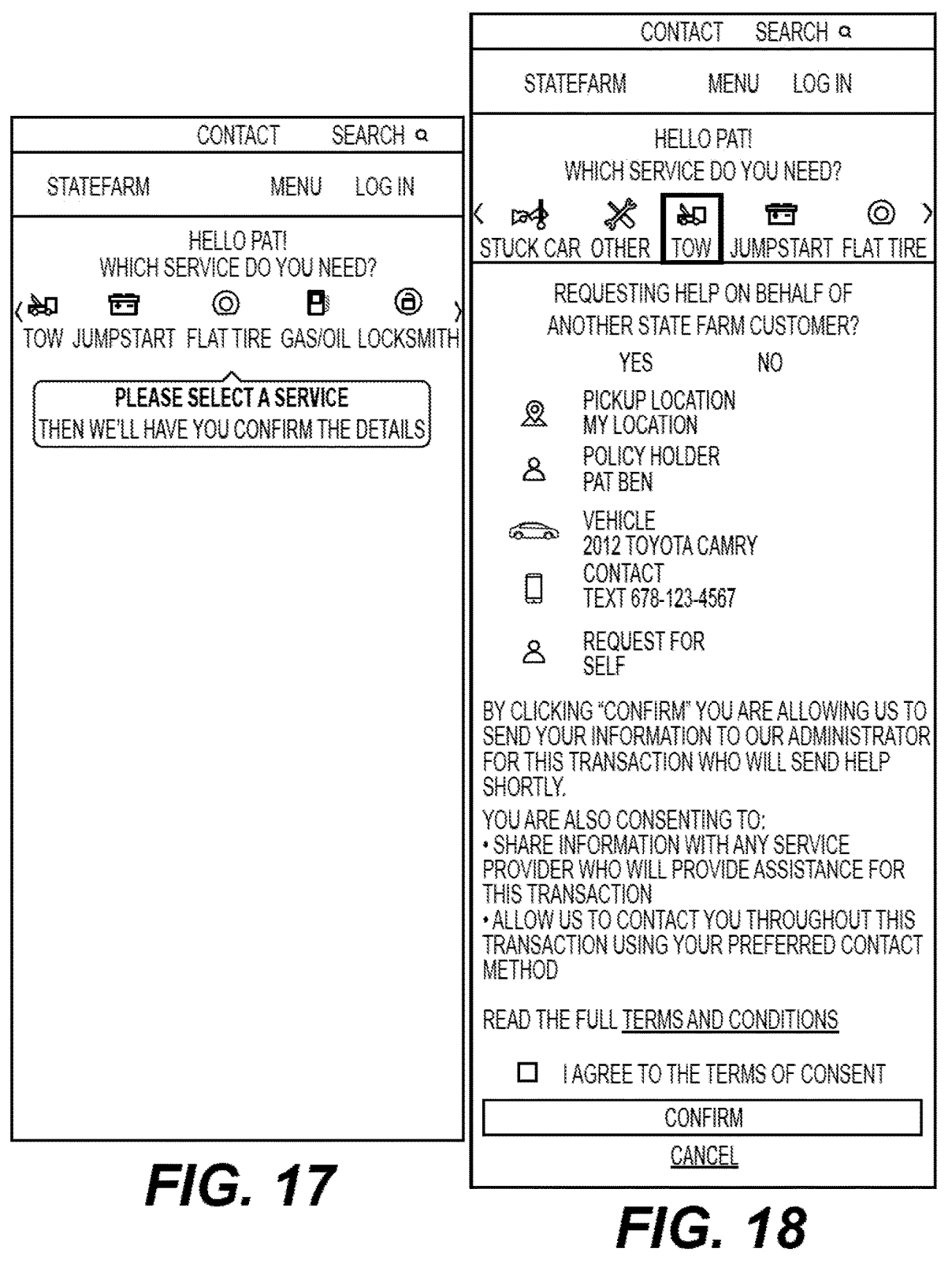
Figures 19, 20:
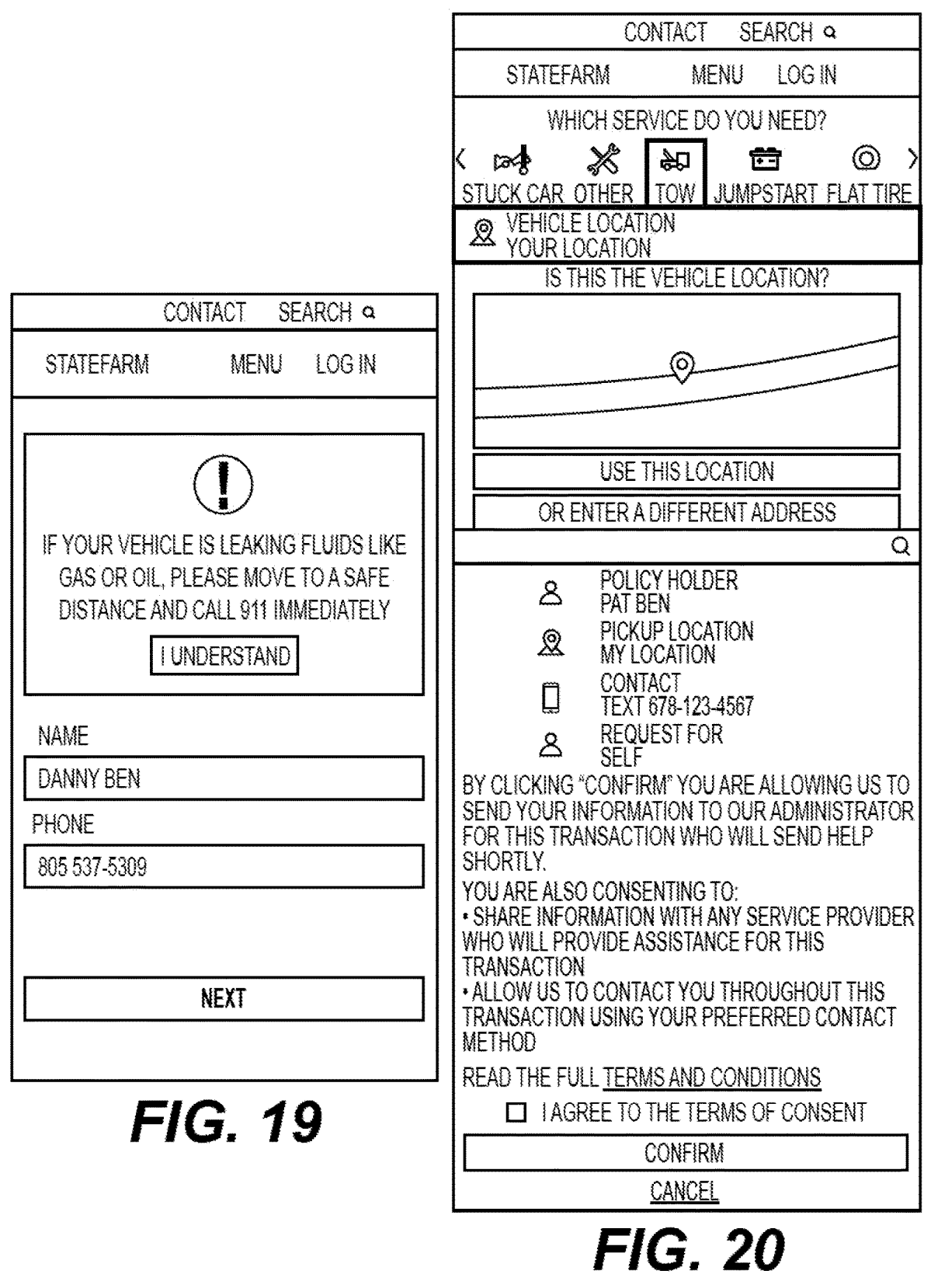
Figures 24, 25:
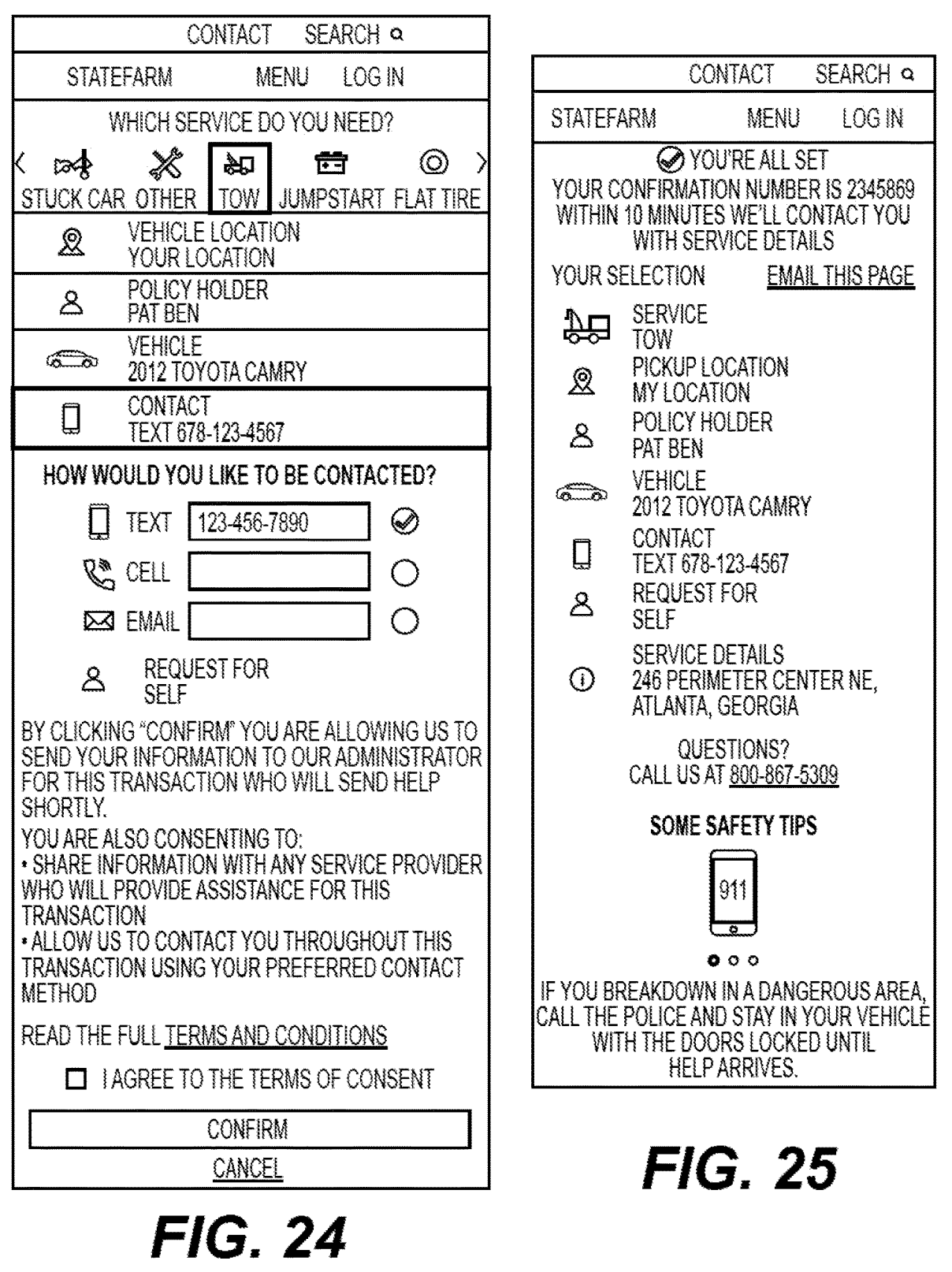

FIGS. 17-25 illustrate various graphical user interfaces dynamically generated by the ERS application of FIG. 5 for providing roadside assistance according to embodiments of the present inventive concept;

FIGS. 26-31 illustrate various graphical user interfaces dynamically generated by the ERS application of FIG. 5 for providing roadside assistance according to embodiments of the present inventive concept that include additional exemplary services; and FIGS. 32-36 illustrate various graphical user interfaces dynamically generated by the ERS application of FIG. 5 for providing roadside assistance according to embodiments of the present inventive concept that include additional exemplary interactive screens.

Figure 1:
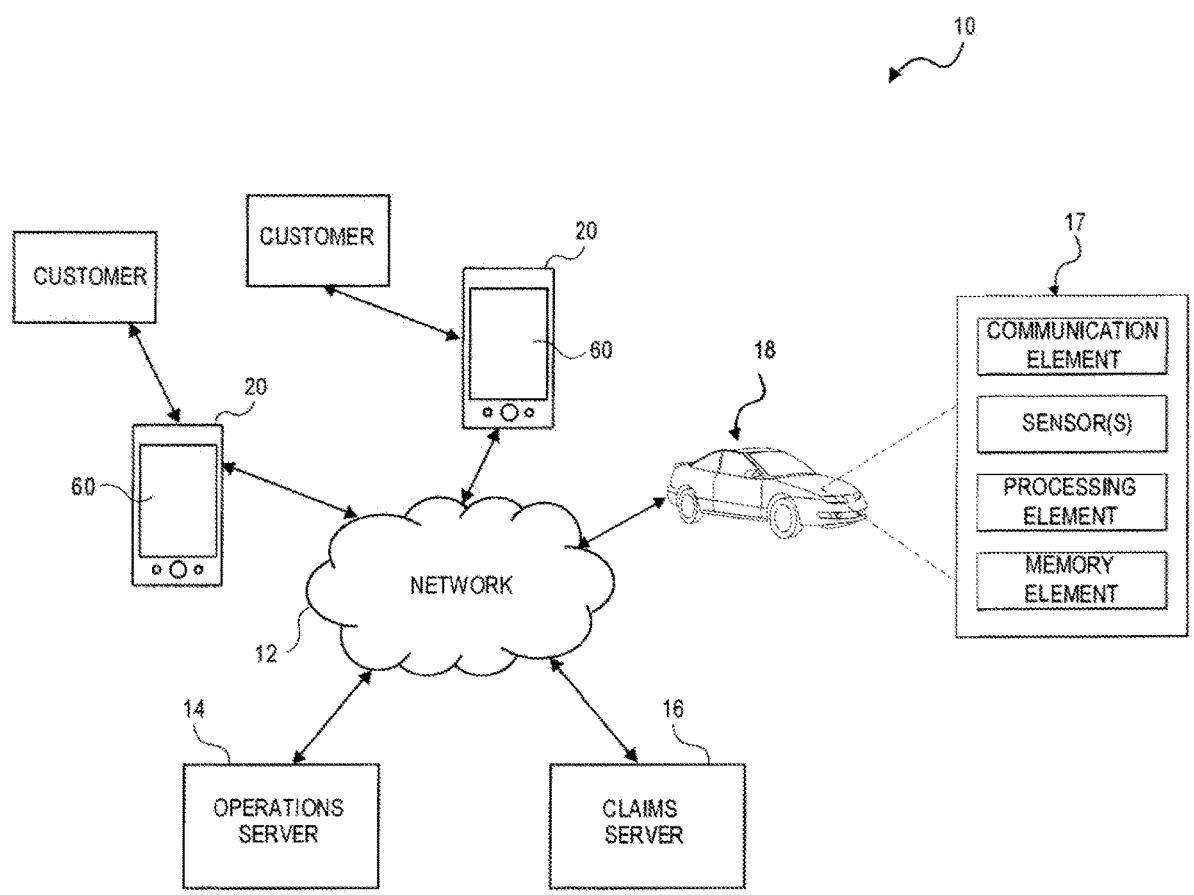
FIG. 1 illustrates various components of an exemplary system for providing roadside assistance shown in block schematic form.
Figure 2:
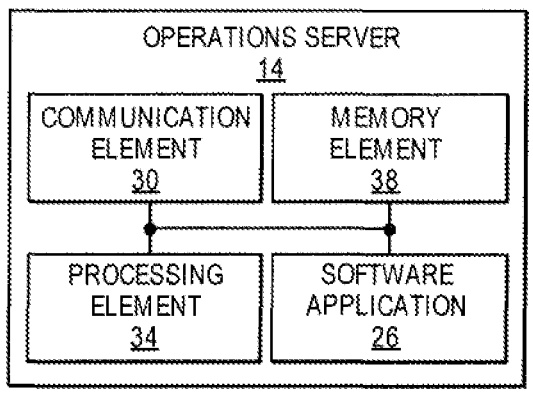
FIGS. 2 and 3 illustrate various components of exemplary servers shown in block schematic form that may be used with the system of FIG. 1.
Figure 3:
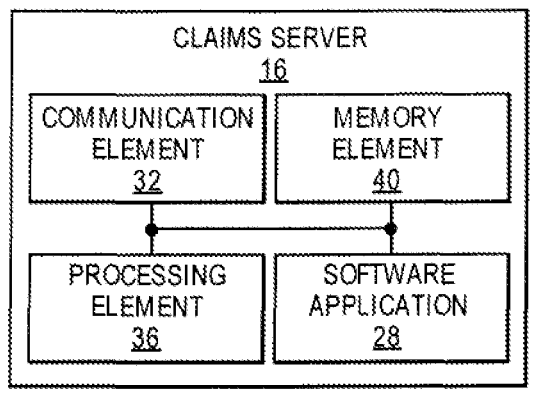

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

An existing software application for requesting roadside assistance may instruct a processor of a computing device to present a series of screens at a display of the computing device. Each screen may be dedicated to a manageable set of entries the user must complete to provide required information for issuing a roadside assistance request. Existing software applications may proceed with receiving and collecting a pre-defined set of data using a pre-defined series of data entry and input fields, in many cases requiring a user to spend a great deal of valuable time merely attempting to complete a service request. In certain scenarios, such inflexible solutions—and the additional time required to utilize them—may lead to costly or even dangerous results.

The present embodiments may relate to, inter alia, an exceptionally efficient, data- and remote backend-driven user experience at a user interface of a computing device during the course of requesting roadside assistance. Reference is made herein to embodiments in which the computing device is a mobile device of a user, though it will be appreciated that other computing devices such as desktop computers are within the scope of the present invention.

In particular, a remote data server may provide real-time data regarding customers and/or vehicles of record to a customer software application of a mobile device that enables issuance of roadside assistance requests. The customer software application may be configured to dynamically shape the user experience according to the real-time data. More particularly, in an embodiment at least one of a plurality of required data objectives is fulfilled elastically using a combination of user input received via a user interface of a mobile device and user data retrieved from a remote server in a manner that provides greater efficiency and requires fewer user interactions.

A "data objective" may be a pre-determined information objective of the customer software application that may be achieved by obtaining user data manually and/or automatically. For instance, a user key may be a data objective. That is, one of the objectives of the customer software application may be to obtain user data that satisfactorily identify a user to an existing customer account, thereby acting as a "user key." For another example, a service type may be a data objective. That is, one of the objectives of the customer software application may be to obtain user data that satisfactorily identify at least one service type being requested by the user. Such user data may be any of a plurality of types, taken alone or in combination, as described in more detail below. "User data" may include any information the customer software application (and/or ERS application, described below) may treat as relevant for completion of a roadside service request for issuance by the user's mobile device according to the invention whose embodiments are discussed herein. For example, "user data" may comprise factual data such as personally identifiable information, vehicle state or identity data, or incident event data, and may also describe aspects of the service request (such as what service type is needed) generated via user input and/or by the dynamic, predictive aspects of embodiments of the present invention.

In an embodiment, the customer software application may include instructions for display of one or more graphical user interfaces reflecting a plurality of data objectives required for completion of a roadside assistance request. The plurality of required data objectives may vary depending on the type of roadside assistance requested. The plurality of required data objectives may relate to or comprise, for example and without limitation: first, middle and/or surname(s) of requesting individual (s); preferred contact information for requesting individual (s); additional user key information (e.g., biometric data, date of birth, account pin/password, etc.) for reducing or eliminating the likelihood of customer mismatch against customer account records; service requested; incident detail(s) such as whether the requested service resulted from an accident or stalled while driving; vehicle state data such as whether the car is operable, where the car is, whether the car has a flat tire, whether a spare is available, whether keys are missing, and/or whether the car is located near a road; desired ultimate disposition of the vehicle, such as where a car should be towed to and whether mechanic work is desired; vehicle identity data, such as make/model, fuel type, VIN etc.; previous corrective action(s) attempted by the requesting individual(s); and other relevant data objectives.

The customer software application may include instructions for automated transition between different forms of representation of each data objective—for example, between entry- and confirmation-based representations—with respect to at least one of the plurality of required data objectives. That is, rather than simply providing a series of data fields that a user must complete, the customer software application may be configured to automatically pull data from a remote server and other data sources and dynamically select data objective representations to optimize (typically, by reducing) the number and type of user interactions required to satisfy required data objectives via embodiments of the computer-implemented methods, systems comprising computer-readable media and electronic devices outlined herein.

For example, an existing mobile application may offer several methods for a user to provide identification information, and the user may select which method to use (for example, where a user is offered the option of signing in through another application or entering login credentials). In contrast, an embodiment of the present invention may enable a plurality of options for identity verification against existing user accounts that are managed "behind-the-scenes"—dynamically and in real-time—at least partly in reliance on the individual user's data retrieved from the remote server. In this manner, the customer software application may dynamically select and display the data objective representation that is least onerous for the user while still satisfying the data objective in question.

By way of further example, the customer software application may obtain and automatically analyze user data (as described in more detail below), and determine that only a single confirmatory data field need be presented to a first user to fulfill an identity-related data objective. Because the single confirmatory data field is not, for example, a field requiring manual data entry by the user, it may reduce the burden on the user. For a second user, however, the same analysis performed on different user data may result in a determination that a more onerous data objective representation is warranted to fulfill the data objective with the required level of confidence (also discussed in more detail below). The customer software application may therefore dynamically select and display a more onerous means for identity verification, for example consisting of a plurality of data fields in which the second user must enter personal information. Such dynamic shaping of the user experience at the user interface, according to real-time data automatically pulled from a remote server and other data sources, may be applied throughout many of the data objectives associated with various request(s) for roadside assistance services.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary System

FIG. 1 depicts an exemplary environment in which embodiments of a system 10 may be utilized for submitting requests for roadside assistance. The environment may include a network 12, an operations server 14 and a claims server 16. The system 10 may include one or more telematics devices 17 mounted to customer vehicle(s) 18. Each telematics device 17 may, with a customer owner's permission, collect data regarding driving events and/or vehicle status, such as: acceleration; braking; cornering; speed; following distance; onboard sensor data relating to tire pressure, oil pressure, catalytic converter operation, etc.; and/or other driving event or status data. The telematics device 17 may periodically or continuously transmit the collected data, for example to one or both of servers 14, 16. All or some of the aforementioned functions may be performed by onboard devices, such as one or more of the communication element, sensor(s), processing element and memory element illustrated in FIG. 1. The exemplary onboard devices comprising the telematics device 17 may be constructed and configured substantially in accordance with the description of the mobile devices 20 (see below) and otherwise in accordance with known technologies for constructing and configuring computing devices—and, more particularly, telematics devices—for data collection and transmission. The system 10 may also include one or more customer mobile electronic devices 20. It is also foreseen that one or more of the customer mobile electronic devices 20—and/or any other computing device—may comprise and/or perform all or part of the functions of the telematics device 17 described herein within the scope of the invention.

Each customer mobile electronic device 20 may execute a customer software application 24, operations server 14 may execute an operations software application 26, and claims server 16 may execute a claims server software application 28.

The network 12 may generally allow communication between the mobile electronic devices 20 and the telematics device 17 on the one hand and the servers 14, 16 on the other hand, and also between the operations server 14 and the claims server 16. In an embodiment—for example where the customer software application 24 carries out a significant portion of the functions outlined herein—the network 12 may also allow communication between the mobile electronic devices 20 and the telematics device(s) 17.

For instance, a mobile electronic device 20 may issue roadside assistance requests via the network 12 and the operations server 14, wherein the issuing customer software application 24 is configured to dynamically adjust required user interactions in accordance with data received over the network 12 from the operations server 14 and/or the claims server 16. Moreover, the telematics device 17 may periodically or continuously provide vehicle data regarding the vehicle 18 of the customer via the network 12 to inform dynamic adjustment of the required user interactions at the device 20.

The network 12 may include local area networks, metro area networks, wide area networks, cloud networks, the Internet, cellular networks, plain old telephone service (POTS) networks, and the like, or combinations thereof. The network 12 may be wired, wireless, or combinations thereof and may include components such as modems, gateways, switches, routers, hubs, access points, repeaters, towers, and the like. The mobile electronic devices 20 generally connect to the network 12 wirelessly, such as radio frequency (RF) communication using wireless standards such as cellular 2G, 3G, 4G, or 5G, Institute of Electrical and Electronics Engineers (IEEE) 802.11 standards such as WiFi, IEEE 802.16 standards such as WiMAX, Bluetooth®, or combinations thereof.

Each server 14, 16 generally retains electronic data and may respond to requests to retrieve data as well as to store data. The servers 14, 16 may be embodied by application servers, database servers, file servers, gaming servers, mail servers, print servers, web servers, or the like, or combinations thereof. Furthermore, the servers 14, 16 may include a plurality of servers, virtual servers, or combinations thereof. The servers 14, 16 may be configured to include or execute software such as file storage applications, database applications, email or messaging applications, web server applications, or the like, in addition to and/or in conjunction with software applications 26, 28. The servers 14, 16 may apply business methods or algorithms, may utilize lookup tables or databases, or combinations thereof to match customers to customer data and account records, locate relevant driving event and/or state data, provide user data to mobile devices 20, automatically provide information about insurance policies and coverage criteria, and to perform other tasks.

The servers 14, 16 may respectively include communication elements 30, 32, processing elements 34, 36, and memory elements 38, 40.

The communication elements 30, 32 generally allow communication with external systems or devices. The communication elements 30, 32 may include signal or data transmitting and receiving circuits, such as antennas, amplifiers, filters, mixers, oscillators, digital signal processors (DSPs), and the like. The communication elements 30, 32 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication elements 30, 32 may establish communication through connectors or couplers that receive metal conductor wires or cables which are compatible with networking technologies such as ethernet. In certain embodiments, the communication elements 30, 32 may also couple with optical fiber cables. The communication elements 30, 32 may be in communication with or electronically coupled to memory elements 38, 40 and/or processing elements 34, 36.

The memory elements 38, 40 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory elements 38, 40 may include, or may constitute, a "computer-readable medium". The memory elements 38, 40 may store the instructions, code, code segments, software, firmware, programs, applications, apps, services, daemons, or the like that are executed by the processing elements 34, 36. The memory elements 38, 40 may also store settings, data, documents, sound files, photographs, movies, images, databases, and the like.

The processing elements 34, 36 may include processors, microprocessors, microcontrollers, DSPs, field-programmable gate arrays (FPGAs), analog and/or digital application-specific integrated circuits (ASICs), or the like, or combinations thereof. The processing elements 34, 36 may generally execute, process, or run instructions, code, code segments, software, firmware, programs, applications, apps, processes, services, daemons, or the like. The processing elements 34, 36 may also include hardware components, such as finite-state machines, sequential and combinational logic, and other electronic circuits that may perform the functions necessary for the operation of embodiments of the current inventive concept. The processing elements 34, 36 may be in communication with the other electronic components through serial or parallel links that include address busses, data busses, control lines, and the like.

Figure 4:
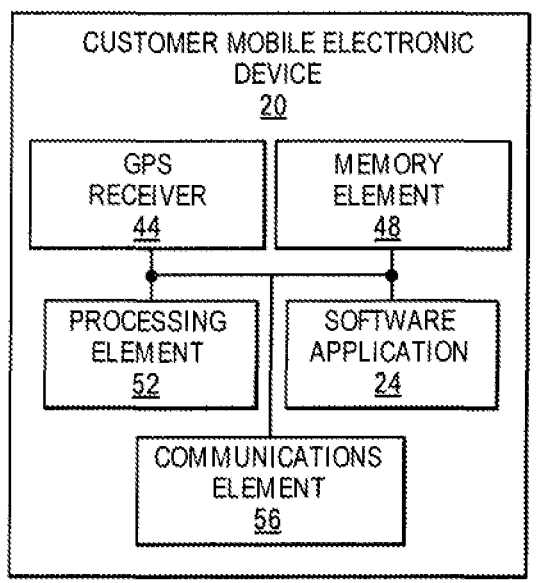
FIG. 4 illustrates various components of exemplary mobile electronic devices shown in block schematic form that may be used with the system of FIG. 1.

A mobile electronic device 20 may be embodied by a smart watch, a smart phone, a personal digital assistant (PDA), a tablet, a palmtop or laptop computer, a notebook, a netbook, a smart watch, smart glasses, wearable electronics, or other mobile device, and may be typically carried by, or near, the customer while driving. Each mobile electronic device 20 may include a GPS receiver element 44, a memory element 48, a processing element 52, a software application 24 and/or a communications element 56, as seen in FIG. 4. The memory elements 48 may store the software application 24, and the processing element 52 may execute the software application 24.

The majority of components of the mobile electronic devices 20—more specifically, the communications elements 56, processing elements 52, and memory elements 48—each operate and are constructed according to similar principles and with similar components to those set forth above with respect to analogous components of the servers 14, 16. GPS receivers 44 operate according to known principles for GPS receivers and/or chips common to smartphones.

The mobile electronic devices 20 may also include displays 60 (see, e.g., FIG. 1) which may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. The displays 60 may possess a square or a rectangular aspect ratio and may be viewed in either a landscape or a portrait mode. In various embodiments, the displays 60 may also include a touch screen occupying the entire screen or a portion thereof so that the display functions as part of a user interface. The touch screen may allow the user to interact with the mobile electronic device 20 by physically touching, swiping, or gesturing on areas of the screen.

The software applications 24 may generally control the behavior of the mobile electronic devices 20 when the devices 20 are interacting with the servers 14, 16, for example via the network 12, according to the configurations described herein and according to the present inventive concept.

Figure 5:
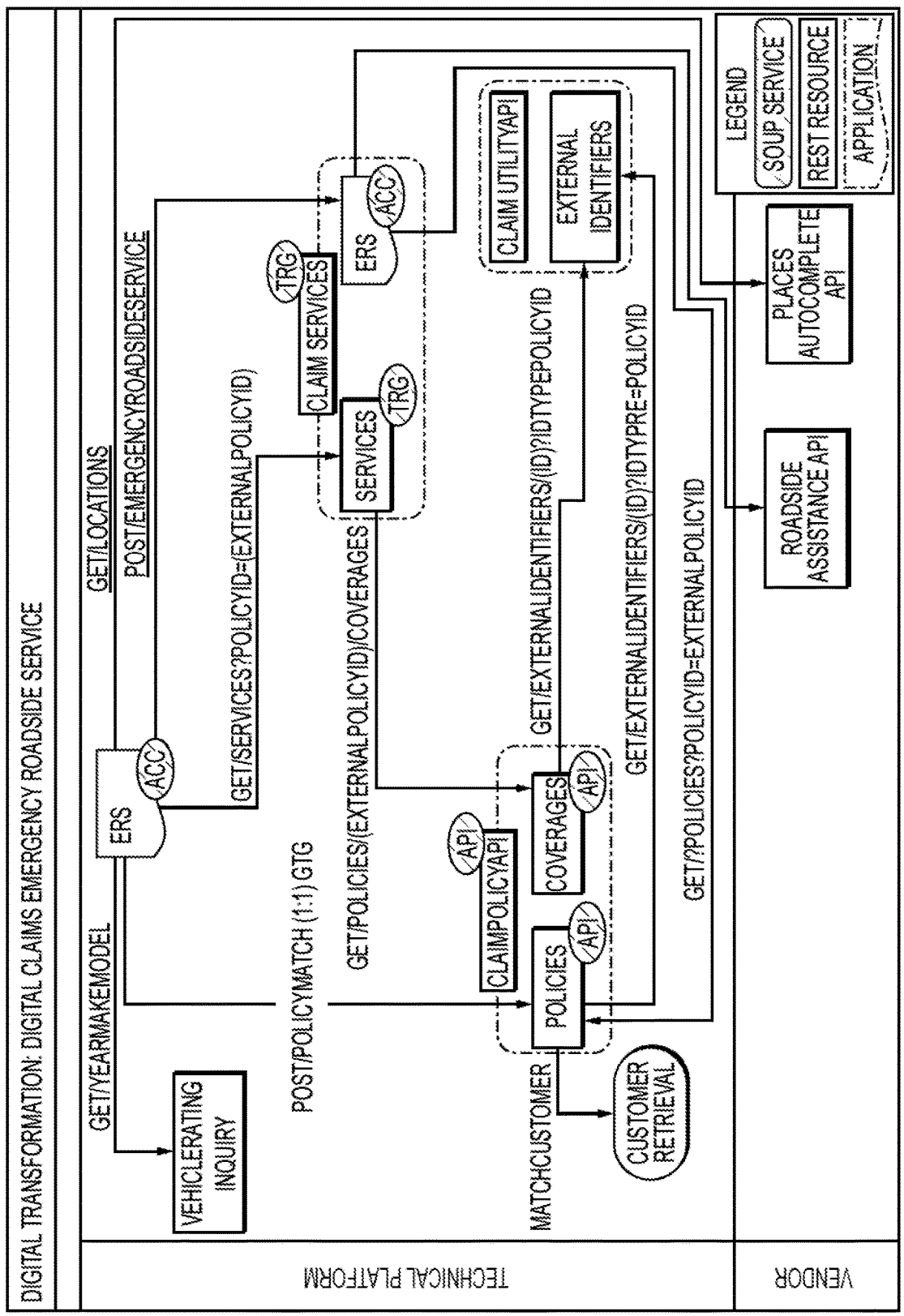
FIG. 5 is a flowchart of various components of, and steps or actions performed via, an exemplary system including an ERS application.

Turning now to FIG. 5, an exemplary block diagram is illustrated for dynamic adjustment of user experiences at user interfaces (including screens 60) of devices 20. The exemplary block diagram includes an emergency roadside services (ERS) application and several simple object access protocol (SOAP) services comprising application programming interfaces (APIs). More particularly, the SOAP services include a Claim Services API, a Claim Policy API and a Claim Utility API. One or more of the APIs may be configured to receive and respond to user data queries (e.g., issued by the ERS application) with customer account and/or telematics data, including information regarding insurance policy(ies), policy coverage of roadside services, personally identifiable information, vehicle information, and information received from the telematics devices 17.

Referring to the system 10 of FIG. 1, the ERS application may reside on each of the devices 20 and comprise and/or work in conjunction with the customer software application 24. The Claim Services API may reside on operations server 14 and be implemented fully or partly by the operations software application 26. The Claim Policy API and the Claim Utility API may reside on the claims server 16 and be implemented fully or partly by the claims server software application 28. However, it is foreseen that the ERS application and APIs and/or their functions described herein may be distributed for execution across various computing devices of a system, and may be co-located on a single device, without departing from the spirit of the present invention. Moreover, it is foreseen that one or more of applications 24, 26, 28 may access data of one or more databases with and/or through one or more database management systems, as is commonly known.

Exemplary Computer-Implemented Method

Figure 6:
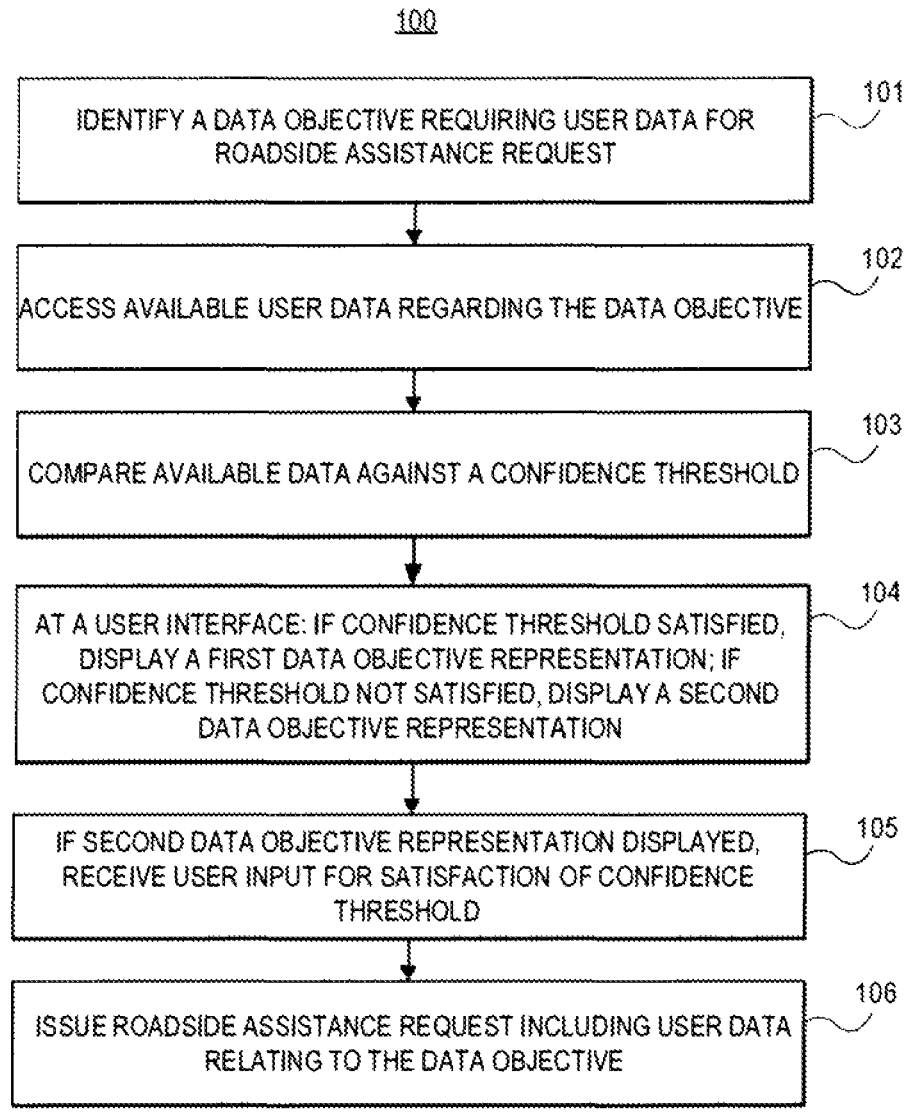
FIG. 6 illustrates at least a portion of the steps of a first exemplary computer-implemented method for issuance of roadside assistance requests.

FIG. 6 depicts a listing of steps of an exemplary computer-implemented method 100 for providing dynamic roadside assistance coordination. The steps may be performed in the order shown in FIG. 6, or they may be performed in a different order. Furthermore, some steps may be performed concurrently as opposed to sequentially. In addition, some steps may be optional. The steps of the computer-implemented method 100 may be performed by the system 10.

The computer-implemented method 100 is described below, for ease of reference, as being executed by exemplary devices and components introduced with the embodiments illustrated in FIGS. 1-5. For example, the steps of the computer-implemented method 100 may be performed by a mobile device 20 and the servers 14, 16 through the utilization of processors, transceivers, hardware, software (such as the ERS application and APis introduced above), firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs, such as a customer software application and an operations software application, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 101, an ERS application running on a user mobile device may identify a data objective requiring user data for completion of a roadside assistance request. For example, the ERS application may include instructions requiring satisfaction of a user key data objective. The user key data objective may require one or more pieces of user data that act as a user key uniquely identifying the user to an existing customer account. The one or more pieces of user data may include a first name, a last name, and a date of birth. Alternatively or in addition, the one or more pieces of user data may include a user name and a password. The one or more pieces of user data may also or alternatively simply include a unique user ID, such as a string of alphanumeric characters assigned to the user and/or the user's policy(ies). One of ordinary skill will appreciate that a wide variety of information—including personal information, key codes, biometric data, possession-based tokens, etc.—may be taken alone or in combination as satisfying a user key data objective within the ambit of the present invention.

In other examples, the data objective may relate to or comprise, for example and without limitation: first, middle and/or surname(s) and/or preferred contact information for requesting individual(s); service type requested; incident detail(s) such as whether the requested service resulted from an accident or stalled while driving; vehicle state data such as whether the car is operable, where the car is, whether the car has a flat tire, whether a spare is available, whether keys are missing, and/or whether the car is located near a road; desired ultimate disposition of the vehicle, such as where a car should be towed to and whether mechanic work is desired; vehicle identity data, such as make/model, fuel type, VIN etc.; previous corrective action(s) attempted by the requesting individual(s); and other relevant data objectives. One of ordinary skill will also appreciate that a wide variety of data objectives may be or become relevant to a roadside assistance request—for example according to the service requested or changing security standards—within the ambit of the present invention.

Referring to step 102, the ERS application may access available user data that is relevant to the data objective. For instance, with respect to a user key data objective, the ERS application may access one or more pieces of user data comprising personally identifiable information regarding the user previously collected via user input at the mobile device. Alternatively or in addition, the ERS application—and/or an application or memory space to which the ERS application has access and/or with which it may be in communication— may have participated in an authentication sequence (in connection with related or unrelated functions) whose results may be repurposed to satisfy the user key data objective. As an example, biometric, password login, token and/or device possession-based, and/or other authentication means may have previously identified the user to a greater or lesser degree. More particularly, a single user may be authorized to access the mobile device and/or the ERS application by fingerprint scan, and the single user may be associated with an existing customer account accessible by the ERS application. The ERS application may have or be given access to an event log or the like on the mobile device showing the prior occurrence of the fingerprint authentication. The fingerprint authentication may, alone or on combination with other event data (such as time since authentication, lack of intervening mobile device lockout, etc.), satisfy the user key data objective according to embodiments of the method(s) outlined herein.

The user data accessed pursuant to step 102 may also or alternatively be stored remotely, and may be accessible via the Claim Services API, the Claim Policy API and/or the Claim Utility API. In an embodiment, the ERS application may match a MAC Address or other device ID against existing customer account records via one or more of the API(s) to determine whether the unique device ID of the mobile device of the user appears in a single existing account record. One of ordinary skill will appreciate that a wide variety of linking information and/or other user data, and a variety of data sources, are within the ambit of the present invention.

Moreover, it is foreseen that each of many various data objectives—such as the exemplary data objectives outlined hereinabove—may benefit from collection of user data according to similar procedures and/or from similar sources without departing from the spirit of the present invention. For instance, a data objective may be identified pursuant to step 101 that relates to and/or comprises identification of a desired roadside assistance service type (i.e., a service type data objective). User data relatable to the service type data objective may be accessed at step 102 by, for example, accessing data previously provided to the ERS application. Such data may include a user input in response to a prompt noting the need to contact emergency services in the event of an emergency. If the response to such a prompt was "no," such user data may be taken into account in confidence threshold considerations (see discussion below) relating to the service type data objective.

For another example, the ERS application may, with the customer's standing and/or express consent, access a remote database—for example via the Claim Services API, the Claim Policy API and/or the Claim Utility API—to obtain telematics data regarding a vehicle associated with the user in an existing user account. The telematics data may, for example, represent one or more driving events and/or vehicle states indicative of a particular failure or circumstance (e.g., loss of tire pressure, engine overheating, sudden stoppage without the application of brakes, etc.) that is relevant to the service type data objective. The ERS application may obtain other relevant user data from the APis— such as vehicle make/model and age, driver age and driving record, etc.—which may be relevant to the service type data objective inquiry. As another example, the APis may receive service or maintenance alerts or reports—for instance, from original equipment manufacturers and/or other automobile industry participants—which may be keyed to vehicle data in customer account records and provided in response to ERS application queries.

Referring now to step 103, the ERS application may compare the user data gathered pursuant to step 102 against a confidence threshold for the data objective. A "confidence threshold" may be a logical, algorithmic, quantitative and/or mathematical standard for evaluating user data regarding a data objective to determine whether and/or to what extent the data objective has been satisfied. In a simple example, if a single piece of user data (such as a matched fingerprint scan) is considered immutable evidence that a user of a mobile phone is the person identified in an existing customer account record, a confidence threshold for a user key data objective may be fully satisfied. Other examples of confidence thresholds are discussed below.

A confidence threshold module of the ERS application may be utilized as the vehicle for evaluating one or more related confidence threshold comparison(s), and may be pre-configured to process the type(s) of user data gathered pursuant to step 102. For example, the confidence threshold module may comprise an algorithm instructing summation of several weighted variables, and comparison of the sum against a threshold number. For another example, the confidence threshold module may specify one or more elements of user data which must be present, alone or in combination with a one or more combinations of other user data (as discussed in more detail below), for satisfaction of the confidence threshold.

As a more particular example—with reference to the user key data objective primarily discussed above—a threshold number may be one (1), and a confidence threshold summation may be configured to evaluate seven types of user data (sought in step 102) against the confidence threshold number. For instance, each of the following pieces of user data may have been sought by the ERS application in step 102 at one or more local and/or remote data sources: (A) first and last name; (B) fingerprint scan; (C) e-mail address; (D) home address; (E) username; (F) account number; and (G) account password. In the threshold summation, each of user data (A), (C) and (D) may be weighted (multiplied) by four-tenths (0.4), user data (B) may be weighted (multiplied) by one (1), and each of user data (E) (F) and (G) by five-tenths (0.5) (sum=(0.4)(A)+(1)(B)+(0.4)(C)+(0.4)(D)+(0.5)(E)+(0.5)(F)+(0.5)(G)). Where a piece of user data has been successfully accessed, its associated variable may be included in the sum (i.e., the corresponding weighting is multiplied by one (1)); where the piece of user data was not accessed or located, its contribution to the sum may drop to zero (i.e., the corresponding weighting is multiplied by zero (0)).

Therefore, if user data (A), (C) and (D) are obtained in step 102, and none of the other user data types are obtained, then the sum of the weighted user data types would equal one and two-tenths (1.2) (sum=(0.4)(1)+(1)(0)+(0.4)(1)+(0.4)(1)+(0.5)(0)+(0.5)(0)+(0.5)(0)). The sum therefore exceeds the threshold number of one (1), which is considered satisfaction or fulfillment of the exemplary mathematical confidence threshold for the user key data objective outlined above. In another scenario, only user data (B) is obtained at step 102, which sums to one (1), equaling and therefore satisfying the threshold number of one (1) (sum=(0.4)(0)+(1)(1)+(0.4)(0)+(0.4)( )(0.5)(0)+(0.5)(0)+(0.5)(0)). In still another scenario, obtaining any two of user data (E), (F) and (G) at step 102 would lead to satisfaction of the threshold number. It will be apparent to one of ordinary skill that many different combinations of user data types and weightings, and settings for the threshold number, are clearly within the ambit of the present invention. Moreover, logical and other standards may be employed as confidence thresholds—alternatively and/or in addition to standards centering on mathematical operations—without departing from the spirit of the present invention.

For another example, one or more user data types may be required, alone or m combination with a weighted summation of other user data types, to satisfy a confidence threshold. For instance, first and last name (user data (A) in the example set forth above) may be required to satisfy a user key data objective confidence threshold, and the other six user data types ((B) through (G)) may be analyzed by comparing a sum against a threshold number in a manner similar to that outlined above. Required user data may be represented in a summation (for example where the weightings of all the remaining user data types of the equation cannot sum to the threshold number) or in an independent logical element of a confidence threshold algorithm without departing from the spirit of the present invention.

It is also foreseen that the weightings in a confidence threshold summation may, themselves, be weighted, for example by taking into account subjectively and/or objectively-assessed characteristics of the user data. For instance, the data sources accessed by the ERS application pursuant to step 102 may each be assigned a trust rating ranging from one (1) to one-tenth (0.1), with a rating of one (1) being assigned to the most trustworthy sources (such as databases maintained by the owner/operator of the servers 14, 16 and/or associated mobile applications executed recently on the mobile device) and one-tenth (0.1) to the least trustworthy sources (such as unvetted, remote third-party databases). Trustworthiness may be assigned manually and/or by machine learning techniques comparing feedback results (see discussion below) against each source of underlying user data. For another example, the weightings may themselves be weighted to reflect a strength of connection (or reliable association) between the retrieved user data and the user attempting to issue the roadside assistance request. That is, the additional weighting may reflect how likely it is that the accessed user data actually relates to the user requesting assistance at the mobile device. Such additional weighting may, for example, include assigning a rating of one (1) to data that certainly relates to the user in question, and one-tenth (0.1) to data that is barely more likely than not to relate to the user in question.

Each of these additional weightings may be applied to the overarching threshold equation through simple multiplication, for example. For instance, user data (A) may be assigned an initial weighting of four-tenths (0.4). The initial weighting may be retained if the first and last name user data obtained in step 102 is reliably retrieved directly from a unique customer account record of a well-maintained, secure remote database of an insurance provider. On the other hand, the initial weighting may be reduced by a factor of ten (10) if the user data is taken from a particularly untrustworthy source, and again or alternatively by a factor of ten (10) if the user data is taken from a record not sufficiently linked to the user in question. One of ordinary skill will appreciate, in view of the disclosure provided herein, that a variety of weightings and combinations of user data, and of algorithms representing confidence thresholds, are within the ambit of the present invention, and that the above examples are not to be taken as limiting.

In addition, the threshold number (or logical or algorithmic elements/requirements) may be manipulated to be more or less stringent, for example depending on another data objective. For instance, a service type data objective may be fulfilled where an ERS application determines with sufficient confidence that a tow is the desired service. Because the outcome of the inquiry into the service type data objective involves moving personal property, the ERS application may be configured to require particularly stringent user authentication. The ERS application may accordingly adopt a more stringent confidence threshold (e.g., by increasing the threshold number) for the user key data objective discussed hereinabove.

Where such an interdependency exists between a confidence threshold of one data objective and the outcome of another data objective, the ERS application may be configured to treat one or both confidence threshold inquiry resolutions as contingently resolved in a first instance. For example, the ERS application may use a baseline user key data objective summation and threshold number initially to allow the user to proceed in the assistance request process at the mobile device after the user data meets or exceeds the initial threshold number. Subsequent resolution of another data objective—such as the service type data objective—may change the applicable confidence threshold. For example, the threshold number for the user key data objective may be raised, and the ERS application may be configured to revisit the user key data objective inquiry until it has obtained user data satisfying the more stringent user key data objective confidence threshold number. Because the ordering of inquiries for the various envisioned data objectives may vary, contingent data objective confidence threshold inquiries are particularly useful in ensuring the least amount of wasted effort by the user. For instance, where a tow service is the only of many roadside services offered via the ERS application that requires a more stringent confidence threshold, it may be beneficial to utilize the initial, less stringent user key data objective confidence threshold on a contingent basis under the assumption that satisfaction of the less stringent number will, more often than not, end up being sufficient.

A data objective may also be associated with multiple confidence thresholds. For example, using the hypothetical outlined above in relation to a user key data objective, one or more rules and/or summations/equations may be used to stratify user data obtained at step 102 into multiple levels according to multiple confidence thresholds. Where an exemplary summation/equation is used: a result between two-tenths (0.2) and five-tenths (0.5) may meet a first, less stringent confidence threshold; a result at or above five-tenths (0.5) and below one (1) may meet a second, intermediate confidence threshold; and a result at or above one (1) may meet a third, highest confidence threshold. The various dynamic features of embodiments of the present invention may be enhanced through use of such multiple confidence thresholds for one or more data objective inquiries.

Further, a confidence threshold module for certain data objective(s) may comprise multiple summations/equations. For example, a service type data objective confidence threshold module may include a summation for each of several different service types, with the summations incorporating different sets of variables/weightings though some overlap is also possible (for example, where the same variable is relevant to two or more service types, to the same or differing degree). The sum of each service type summation may be compared against the others to determine the service type most likely desired by the user.

For instance, a tow service summation may include variables corresponding to a first set of user data, a flat tire may include variables corresponding to a second set of user data, and so on and so forth. Summing the variables of each individual service type summation may result in a plurality of confidence number sums—one for each service type—which may then be compared against one another and/or against respectively applicable confidence threshold numbers to determine the most likely service type. In an embodiment, the highest confidence number sum may also be compared against one or more confidence threshold numbers to determine an appropriate representation of the service type data objective for display to the user (discussed in more detail below).

In some cases, several separate summations or equations may not result in a single confidence number sum sufficient to meet an applicable confidence threshold number. In other cases, more than one individual summation may meet applicable confidence threshold number(s), for example because of imperfections in the models and/or user data, and/or because some services may not be mutually exclusive. In still other cases, only one individual summation may produce a confidence number that meets an applicable confidence threshold number, but a confidence number sum associated with a different service type may be produced by another individual equation (e.g., where a different service type is a mutually exclusive service) that may be sufficiently close in value to prompt the ERS application to trigger an exception. The exception may cause the ERS application to default to a more demanding, invasive or stringent representation of the service type data objective (see discussion below for more detail), reflecting the uncertainty caused by the closely trailing second confidence number sum. It is foreseen that a wide variety of relationships between competing summations/equations and/or rules under a single data objective may be established (and revised in view of feedback data, also described below) without departing from the spirit of the present invention.

It is foreseen that the aforementioned types of user data and/or the various weightings and threshold numbers, as well as the relationships between various modules, algorithms and summations/equations described above, may be automatically adjusted by employing machine learning techniques. A machine learning program may include curve fitting, regression model builders, convolutional or deep learning neural networks, Bayesian machine learning techniques, or the like. The machine learning program may be fed feedback data and underlying user data types, weightings, and/or threshold number(s), to determine patterns of sub-optimal performance of the confidence threshold modules of the ERS application. The feedback data may be taken, for example, from error reports (e.g., identifying mismatches of users and customer accounts under a user key data objective), may comprise user inputs seeking to manually correct automatically displayed (e.g., confirmation-based) or similar minimally invasive data objective representations (as discussed in more detail below), or other useful data reflecting the accuracy of the predictive aspects and modules of the ERS application.

As an example, in connection with service type data objective inquiries, the ERS application may initially be configured to obtain user data (e.g., at step 102) comprising telematics data via one or more of the APis available at servers 14, 16. The telematics data may indicate a sudden stop made by a vehicle associated with the user, and a service type data objective confidence threshold algorithm may be configured to treat such user data as a particularly reliable (i.e., conclusive or near-conclusive) factor for satisfying the data objective inquiry in favor of a tow service.

The corresponding confidence threshold module of the ERS application may therefore produce results causing display of a confirmation-based representation of the service type data objective comprising the phrase "Tow Service" with a check mark beside the phrase (rather than, for example, a more invasive, entry-based representation requiring the user to select a service, as discussed in more detail below). However, over time, the ERS application may observe through feedback data that a large percentage of users tend to manually change the "Tow Service" selection when offered based on such confidence threshold determination(s), instead selecting "Flat Tire" or the like. The ERS application may, based on correlations drawn from the feedback data, automatically adjust elements of the confidence threshold module—such as the implicated user data types and/or weightings, threshold numbers and/or relationships and interdependencies—to reflect a lesser correlation between sudden stops and a desire to receive a tow services service type. One of ordinary skill will appreciate that such machine learning techniques may be applied variously across many of the data objectives and confidence threshold module elements disclosed or fairly suggested herein within the ambit of the present invention.

Referring to step 104, the ERS application may issue instructions for display of a first data objective representation if a confidence threshold was satisfied at step 103, or for display of a second data objective representation if the confidence threshold was not satisfied. A "data objective representation" may be that area of a user interface selectively populated by the ERS application to: (1) communicate user data to a user that has met one or more confidence threshold(s) relating to the data objective in question; and (2) prompt the user's assistance in completing the data objective, for example by reviewing and choosing not to change the displayed user data (i.e., "confirmation-based" furtherance of the data objective) and/or by providing user input via the user interface (i.e., "entry-based" furtherance of the data objective).

Returning to the example of FIG. 6, the first data objective representation may be confirmation-based, meaning that lack of correction by the user is considered sufficient to confirm that the confidence threshold determination was correct with respect to that data objective. For example, with reference to the user key data objective discussed above, the first data objective representation may include display of the full name matched to the user through consultation of existing customer account records, along with another piece of data retrieved from the existing account records (for example, by listing a car make/model associated with the matched account record). If the user reviews this data and does not select an option indicating that the displayed information (and therefore the matched account record) is incorrect, the user key data objective may be considered satisfied. The second data objective representation, on the other hand, may be more invasive (e.g., requiring additional input from the user), such as by employing entry-based confirmation. In the example discussed above, the user may be prompted, according to the second data objective representation, to enter or select additional user data of the types considered by the applicable confidence threshold module to improve the user data and, hopefully, reach a higher level of confidence for the user key data objective.

It is foreseen that the data objective representations may take many different forms, and may require review by and/or input of the user in many different ways, without departing from the spirit of the present invention, provided that the various data objective representations available for one or more data objective(s) may be selected, at least in part, based on the determination(s) of the applicable confidence threshold module(s).

Referring to step 105, if the second data objective representation is displayed, the ERS application may receive user input for satisfaction of the applicable confidence threshold(s). For example, where the user key data objective is the focus of the inquiry, the second data objective representation may be an entry-based confirmation requiring, for example, entry of a date of birth that may be matched against existing account records to increase the user key data objective summation (or otherwise advance satisfaction of an equation/algorithm of the confidence threshold module) to meet the applicable confidence threshold. For another example, where the service type data objective is the focus of the inquiry, the second data objective representation may be an entry-based confirmation requiring, for example, the user to select from a subset of service types culled from a larger set based on analysis by the applicable confidence threshold module(s) of the user data gathered at step 102.

Referring to step 106, the ERS application may achieve satisfaction of the required data objectives—for example by performing one or more of the above-described steps in one or more combination(s) for one or more of the required data objectives—and proceed with issuing a roadside assistance request including user data relating to at least one of the required data objectives. For instance, where particularly useful user data is available and all applicable confidence thresholds for required data objectives are satisfied by such user data gathered at initial gathering steps 102, step 105 may be omitted (e.g., where confirmation-based data objective representations are used for each of the required data objectives) and the roadside assistance request may be issued without the need for user input(s) at step 105. For another example, multiple or all of the data objectives may require additional user input for satisfaction of applicable confidence threshold(s) without departing from the spirit of the present invention.

Exemplary Commercial Embodiment of an Ers Application

FIGS. 7-36 depict various graphical user interfaces (GUis), organized by exemplary groupings and/or subject matter, for display at a user mobile device. The GUis illustrate operation of an exemplary commercial embodiment of the ERS application for providing dynamic roadside assistance coordination via a mobile device. Display of the various GUis may be in the order shown in FIGS. 7-36, or in different orders. Furthermore, some or all GUis may be displayed concurrently as opposed to sequentially, for example by occupying the device's screen at the same time. In an embodiment, the GUis of FIGS. 7-16 (optionally, together with several other screens of FIGS. 26-36) may be made available as collapsible portions of a single "page" or the like without the need for navigating between pages as is traditionally required. In addition, some GUis may be optional. The ERS application may proceed through the various combinations of GUis by performing the steps of the method 100 described above one or more times (and/or any combination(s) of the steps thereof), and/or by performing other step(s) described herein or fairly understood from review of this disclosure.

The ERS application may be executed in the environment(s) described herein, for example within the system 10. The ERS application is described below, for ease of reference, as being executed by and/or in communication with exemplary devices and components introduced with the embodiments illustrated in FIGS. 1-5. For example, the ERS application may be executed and/or instruct display of the various GUIs at a mobile device 20, and may be in periodic or continuous communication with the operations server 14 through the utilization of processors, transceivers, hardware, software (such as the APIs introduced above), firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs, such as the ERS application and/or customer software application and an operations software application, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Turning to FIGS. 26-31 and 32-36, each set of drawings generally respectively represents an exemplary sequence of GUIs that may comprise all or a portion of the screens a user may navigate while attempting to issue a roadside assistance request. The screens of FIGS. 7-16 may represent a sequence in which an initial user key data objective inquiry did not satisfy a second confidence threshold (discussed below). The screens of FIGS. 17-25 may, on the other hand, represent a sequence in which an initial user key data objective inquiry did satisfy the second confidence threshold.

Referring briefly to FIGS. 26-31 and 32-36, the drawings depict various GUIs or screens optionally displayed in connection with the sequences shown in FIGS. 7-16 and/or 17-25 or otherwise by the ERS application, dependent on the flow of user data collection, the user input, and/or the configuration of the ERS application, as discussed in more detail below.

Figure 7:
Figure 8:

Turning now to FIGS. 7 and 17, in each case the ERS application may have accessed user data regarding the user key data objective (for example, in the manner described in preceding sections) sufficient to satisfy at least one confidence threshold. For example, the ERS application may have accessed user data stored in a memory element of the mobile device, received user input, and/or directly or indirectly queried at least one of the Claim Services API, Claim Policy API and Claim Utility API. The accessed user data may have satisfied a first confidence threshold of an algorithm of a user key data objective confidence threshold module of the ERS application in each of the scenarios of FIGS. 7 and 17. For example, in each case the user data may have been matched against an existing customer account record with a degree of confidence that met the first confidence threshold. However, the user data may not have met a second confidence threshold in at least one embodiment, leading to the divergence of the scenarios depicted respectively in FIGS. 7-16 and 17-25 and discussed in more detail below. One of ordinary skill will appreciate that the second confidence threshold may relate to a separate data objective—such as an authentication data objective—within the ambit of the present invention. It is also foreseen that authentication—considerable separately from the mere provision of personally identifiable information—may be optional without departing from the spirit of the present invention.

In an embodiment, the first confidence threshold for the user key data objective may be less stringent, for example by requiring less than one hundred percent (100%) confidence in matching the user data to a particular customer account record. In an embodiment, the second confidence threshold may comprise a higher (more stringent) threshold. The second confidence threshold may also or alternatively comprise a qualitatively separate threshold. A qualitatively separate threshold may comprise one or more elements of user data that must be present for authentication, separate and apart from customer account record matching, to be completed. In an example, the first confidence threshold may be satisfied if user data (e.g. personally identifiable information) matches only a single customer account record, whereas a second confidence threshold may be satisfied only by provision of an account pin, token and/or fingerprint scan, for example.

An exemplary confidence threshold inquiry for the user key data objective may be conducted at least in part by reference to one or more of the Claim Services API, the Claim Policy API and/or the Claim Utility API. The APIs may comprise or include customer account data (e.g., insurance policy, coverage and/or services data) stored according at least in part under an entity-relationship model of data storage. The user data acquired as part of the confidence threshold inquiry may include external identifiers for keying the user of the mobile device to one or more customer account records. A person of ordinary skill will recognize, however, that multiple database management structures and systems may be used without departing from the spirit of the present invention.

As best illustrated in FIGS. 7 and 17, the first confidence threshold may have been met by user data prior to display of the depicted GUIs at the mobile device. All or part of the user data accessed by the ERS application and/or retrieved from the matched customer account record may accordingly be displayed on a confirmation basis as shown in FIGS. 7 and 17. In another embodiment, one or more intermediate confidence threshold(s)—for example, relating to vehicle identity and/or contact information data objectives—may have been met prior to display of all or part of such user data.

The ERS application may, in an embodiment, also access user data under a service type data objective inquiry and, if the user data satisfies a corresponding confidence threshold, instruct display of a confirmation-based data representation of the service type data objective inquiry (as outlined in preceding sections). FIGS. 7 and 17 illustrate an embodiment in which such a confidence threshold has not been met—thereby requiring display of a second data objective representation which is more invasive—and/or in which the ERS application is simply configured to require user entry of a service type. Also or alternatively, the services offered to the user according to FIGS. 7 and 17 may represent a subset of services generally available via the ERS application, but which were culled from a larger set based on analysis by applicable confidence threshold module(s) of user data (as described above). For example, a customer account record may be matched to user data accessed via one or more of the APIs under the user key data objective inquiry, and the customer account record may include one or more service types covered by a user insurance policy with reference to a car of the user registered under the policy.

In response to the service type query posed to the user, the user may select a service type via input at the GUI. The ERS application may instruct display of one or more subsequent GUIs relating to additional data objective inquiries, where such subsequent GUIs may be triggered partly or wholly by the service type selection. For example, FIGS. 7-25 illustrate selection by the user of a tow services service type. This service type selection may lead to display of an incident detail data objective representation (see accident verification GUI of FIG. 8), for example where a confidence threshold with respect to the incident detail data objective was not otherwise satisfied by user data automatically accessed by the ERS application. Further, the selection may prompt certain informational screens, such as the gas and oil leakage warning shown in FIG. 19. Still further, the user data accessed under the one or more data objective inquiries conducted by the ERS application may raise a confidence threshold relating to a requesting party data objective, prompting display of a requesting party data objective representation such as those illustrated in FIGS. 18 and 22.

Figure 9:
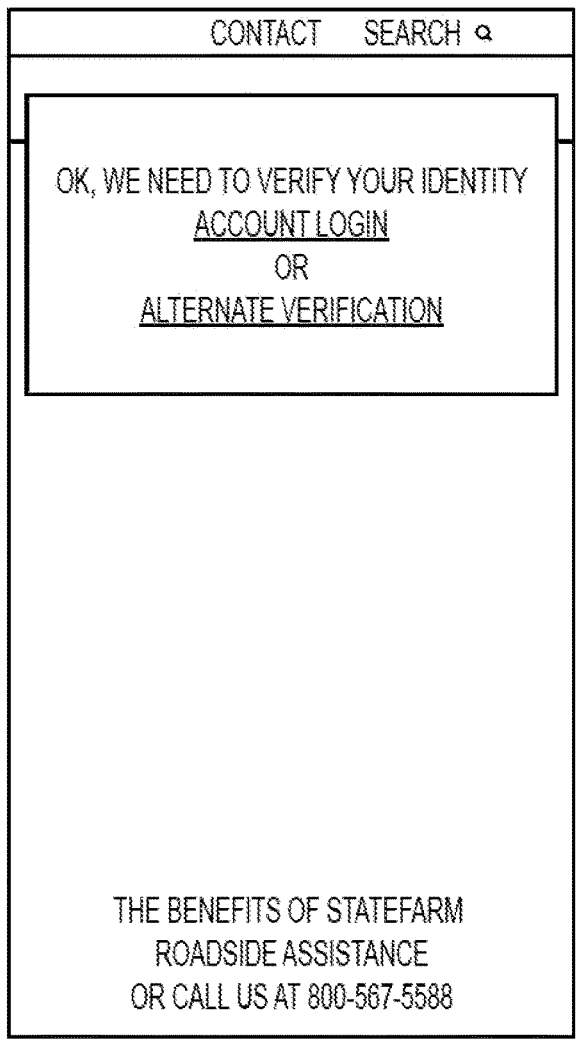
Figure 10:
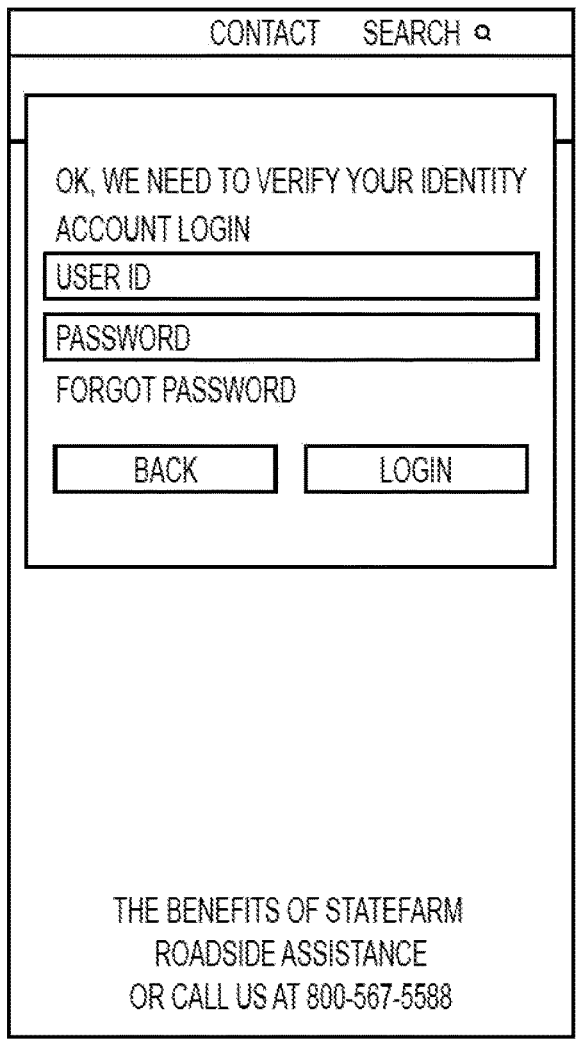
Figure 21:
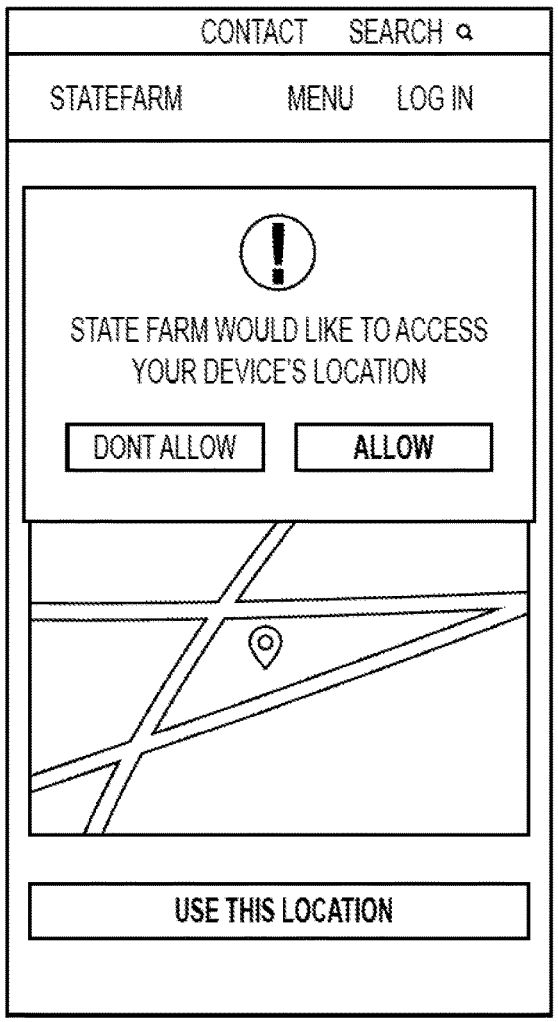
Figure 22:
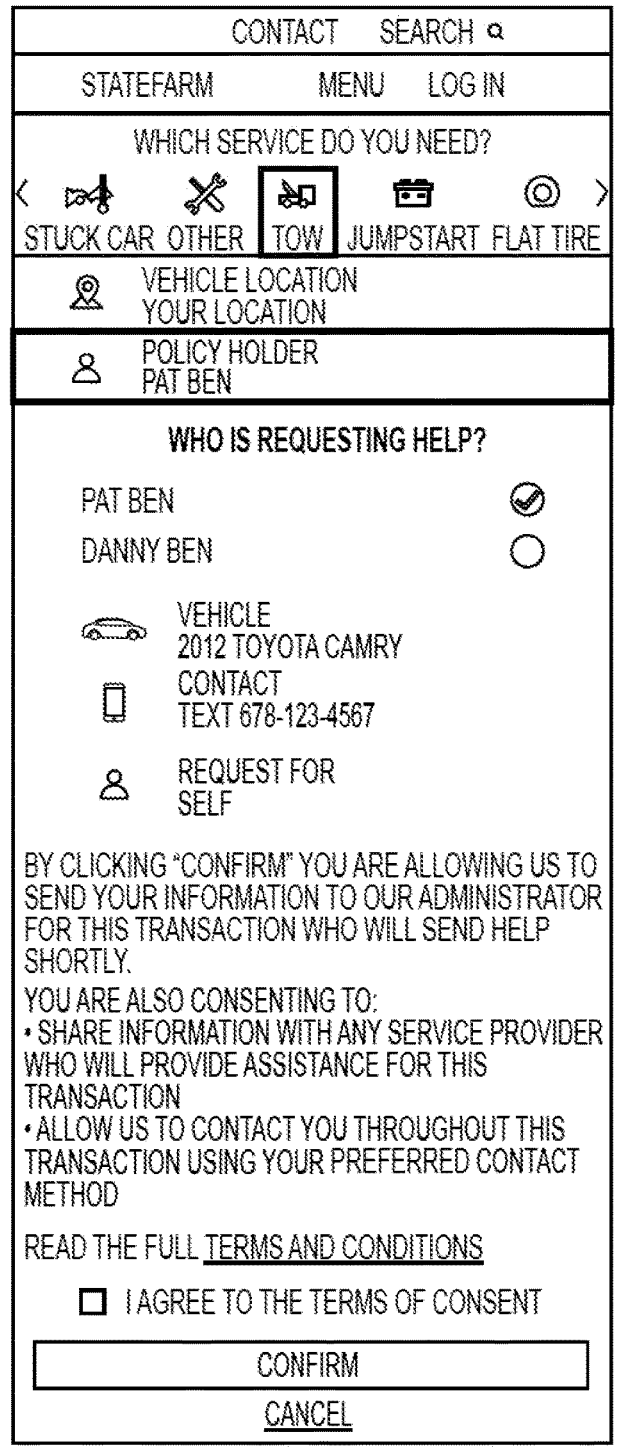
Figure 26:
Figure 27:
Figure 28:
Figure 29:
Figure 30:
Figures 31, 32:
Figures 33, 34:

The ERS application may also instruct display a second objective representation of the user key data objective where the second confidence threshold discussed above has not been met. In the Figures, this is illustrated in FIGS. 9-11. These GUIs are entry-based representations for collecting specific user data by manual input for use in authenticating or otherwise identifying the user to enable issuance of the roadside assistance request.

The ERS application may also instruct display one or more objective representation(s) of a vehicle location data objective. The objective representation(s) may vary based on the outcome of one or more user data comparison(s) against confidence threshold(s). For example, where the user data does not satisfy a vehicle location data objective, the ERS application may instruct display of an entry-based objective representation of the vehicle location data objective such as those shown in FIGS. 20-21 and 12-13. It should be noted that at least the GUI of FIG. 12 includes two representations of the vehicle location data objective—a confirmation-based (i.e., "Nearest Location" with checkmark) and an entry-based (i.e., "Custom Location" data fields) representation of the vehicle location data objective, it being understood that multiple representations may be generated for concurrent display and for alternative or parallel use without departing from the spirit of the present invention. The vehicle location objective may also or alternatively be satisfied, in whole or in part, by accessing third party services such as the Autocomplete API made available in connection with the Google® service mark as illustrated in FIG. 5.

Another data objective may comprise a contingent vehicle identity data objective (see discussion of contingent objective(s) and/or threshold(s) in preceding sections). For instance, because the user selected a tow service type in the GUI sequences of FIGS. 7-25, the ERS application may be configured to require satisfaction of a vehicle identity data objective. More particularly, the ERS application may require satisfaction of a vehicle identity data objective. A confidence threshold of a vehicle identity data objective may be met by accessing user data via one or more of the Claim Services API, the Claim Policy API, and the Claim Utility APL. Where user data is insufficient to satisfy a confidence threshold for the vehicle identity data objective—such as where a customer account record lists several vehicles under one or more insurance policy(ies) or where the customer data does not reference a vehicle—the ERS application may instruct display of one or more representations of the vehicle identity data objective. For example, a purely entry-based representation may be employed as illustrated in FIG. 14, or a hybrid confirmation-based representation may be employed as illustrated in FIG. 23. The "hybrid" representation may essentially include an objective representation in which a single vehicle is initially marked but a second vehicle is displayed alongside for optional selection by the user.

It is foreseen that more or fewer of the data objectives evident from review of FIGS. 7-25, and/or other data objectives outlined herein or fairly understood from review of this disclosure, may be addressed within the ambit of the present invention. Moreover, it is foreseen that more or fewer of such data objectives may be pursued via user data/confidence threshold comparisons and/or resultant selection(s) of data objective representations without departing from the spirit of the present invention. It is also foreseen that the data objectives may be interdependent and fluid with respect to the data objective requirements and/or confidence threshold(s) and/or level(s) without departing from the spirit of the present invention.

Following satisfaction of the required data objectives in a given embodiment, the ERS application may be configured to instruct display of summary and/or confirmation GUIs (see FIGS. 15-16 and 24-25) at the mobile device. The summary and/or confirmation GUIs may call out incomplete or partially complete—though perhaps not "required"—data objectives (see FIG. 24) and/or cause display of confirmation-based data objective representations for optional completion by the user in connection with issuance of the roadside assistance request. Moreover, the summary and/or confirmation GUIs may include contract terms data objectives, which may be entry-based (for example, by requiring the user to check an "I agree" checkbox). In certain embodiments—for example where a customer insurance policy that includes complete coverage of the requested service was not located among the user data—the ERS application may also require entry of payment information. The ERS application may also require the user to select from multiple insurance policies, where applicable.

The ERS application may also be configured to issue the roadside assistance request, for example to a third-party service provider (or Road Side Assistance) API, as shown in FIG. 5. The roadside assistance request may include all or part of the user data accessed and/or gathered during the dynamic, remote data-driven user experience outlined herein.

According to embodiments of the present invention, rather than simply providing a series of data fields that the user is required to complete, the ERS application may be configured to automatically pull data from a remote server and other data sources and dynamically select data objective representations to optimize (typically, by reducing) the number and type of user interactions required to satisfy required data objectives. In this manner, the ERS application may dynamically select and display data objective representations to render issuance of a roadside assistance request less onerous for the user.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(±) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A method for presenting one or more dynamic and data-driven representations at a user interface, the method comprising, via one or more processors or transceivers:
   based at least in part on determining that vehicle state data satisfies a first confidence threshold, causing the user interface to display:
      a first data objective representation associated with the first confidence threshold, and
      a second data objective representation associated with a second confidence threshold and a third confidence threshold,
         wherein the second confidence threshold is associated with user account data and is based at least in part on a first requirement for a first roadside service of a first resource intensity, and
         wherein the third confidence threshold is associated with telematics data and is based at least in part on a second requirement for a second roadside service of a second resource intensity distinct from the first resource intensity;
   determining whether the first requirement is met by determining whether the vehicle state data satisfies the second confidence threshold;
   determining whether the second requirement is met by determining whether the vehicle state data satisfies the third confidence threshold;
   dynamically selecting at least one of the first data objective representation or the second data objective representation based at least in part on the second confidence threshold determination and the third confidence threshold determination,
      the first data objective representation being a first confirmation-based representation, and
      the second data objective representation being a second confirmation-based representation comprising one or more of a first confirmation input associated with the second confidence threshold or a second confirmation input associated with the third confidence threshold; and
   displaying, at the user interface, the selected one of the first data objective representation or the second data objective representation.

2. The method of claim 1, further comprising receiving additional vehicle state data from a telematics device associated with a vehicle in response to the second data objective representation being displayed at the user interface, the additional vehicle state data comprising vehicle telematics data for the vehicle,
   wherein determining whether the vehicle state data satisfies the third confidence threshold comprises determined whether the vehicle telematics data satisfies the third confidence threshold.

3. The method of claim 2, wherein the vehicle telematics data indicates a sudden stop of the vehicle, and wherein the third confidence threshold represents an indication of a sudden stop of a vehicle.

4. The method of claim 1, wherein the first roadside service is a flat tire service and the second roadside service is a tow service.

5. The method of claim 1, wherein the third confidence threshold is associated with an indication of one or more of:
   a sudden stop of a vehicle,
   an oil pressure, or
   a tire pressure.

6. The method of claim 1, further comprising ordering the first confirmation input and the second confirmation input in the second data objective representation based at least in part on the first resource intensity and the second resource intensity.

7. The method of claim 1, wherein the vehicle state data comprises an indication of a vehicle incident.

8. The method of claim 1, wherein a data objective associated with the second data objective representation is a service type data objective and the first roadside service is based at least in part on a user input comprising selection of a service type at the user interface.

9. The method of claim 1, wherein a data objective associated with the second data objective representation is a service type data objective and the first roadside service is based at least in part on telematics data relating to a vehicle state accessed via an application programming interface of a remote server.

10. The method of claim 1, wherein a data objective associated with the second data objective representation is a service type data objective and the first roadside service is based at least in part on vehicle incident event data.

11. The method of claim 10, wherein the vehicle incident event data comprises data indicating one or more of:
    a vehicle component failure,
    a sudden vehicle stoppage,
    a vehicle collision, or
    vehicle operability.

12. The method of claim 1, wherein the second confidence threshold is contingent and a data objective associated with the second data objective representation comprises a user key data objective, the method further comprising:
    accessing service type user data relevant to a service type data objective associated with the data objective;
    determining that the service type user data satisfies a service type confidence threshold;
    identifying a user key data objective confidence threshold;
    accessing the user account data; and
    determining whether the user account data satisfies the user key data objective confidence threshold.

13. A system for presenting one or more dynamic and data-driven representations at a user interface, the system comprising:
    one or more memories having a set of instructions stored thereon; and
    one or more processors configured to execute the set of instructions to perform operations comprising:
        based at least in part on determining that vehicle state data satisfies a first confidence threshold, causing the user interface to display:

a first data objective representation associated with the first confidence threshold, and a second data objective representation associated with a second confidence threshold and a third confidence threshold, wherein the second confidence threshold is associated with user account data and is based at least in part on a first requirement for a first roadside service of a first resource intensity, and wherein the third confidence threshold is associated with telematics data and is based at least in part on a second requirement for a second roadside service of a second resource intensity distinct from the first resource intensity;

determining whether the first requirement is met by determining whether the vehicle state data satisfies the second confidence threshold;

determining whether the second requirement is met by determining whether the vehicle state data satisfies the third confidence threshold;

dynamically selecting at least one of the first data objective representation or the second data objective representation dependent at least in part on the second confidence threshold determination and the third confidence threshold determination, the first data objective representation being a first confirmation-based representation, and the second data objective representation being a second confirmation-based representation comprising one or more of a first confirmation input associated with the second confidence threshold or a second confirmation input associated with the third confidence threshold; and displaying, at the user interface, the selected one of the first data objective representation or the second data objective representation.

14. The system of claim 13, further comprising receiving data in response to the second data objective representation being displayed at the user interface.

15. The system of claim 13, wherein at least a part of the vehicle state data is accessed via an application programming interface of a remote server.

16. The system of claim 13, further comprising issuing a request for roadside assistance.

17. The system of claim 13, wherein the second confidence threshold includes a requirement for a specified user data type.

18. The system of claim 17, wherein a data objective associated with the second data objective representation comprises a user key data objective and the second confidence threshold includes a requirement for a first and last name of a user.

19. The system of claim 17, wherein a data objective associated with the second data objective representation comprises a service type data objective and the second confidence threshold includes a requirement for a user input comprising selection of a service type at the user interface.

20. The system of claim 17, wherein a data objective associated with the second data objective representation comprises a user key data objective and the second confidence threshold includes a requirement for at least one of a first and last name, a date of birth, or a telephone number.

* * * * *